(12) United States Patent
Kumar

(10) Patent No.: US 6,651,140 B1
(45) Date of Patent: Nov. 18, 2003

(54) CACHING PATTERN AND METHOD FOR CACHING IN AN OBJECT-ORIENTED PROGRAMMING ENVIRONMENT

(75) Inventor: Subbarao Ravi Kumar, Louisville, CO (US)

(73) Assignee: Sun Microsystems, Inc., Palo Alto, CA (US)

(*) Notice: Subject to any disclaimer, the term of this patent is extended or adjusted under 35 U.S.C. 154(b) by 463 days.

(21) Appl. No.: 09/654,184

(22) Filed: Sep. 1, 2000

(51) Int. Cl.[7] .............................. G06F 13/00; G06F 9/44
(52) U.S. Cl. ...................... 711/118; 709/213; 709/203; 717/118
(58) Field of Search ......................... 711/118; 709/213, 709/203; 717/118

(56) References Cited

U.S. PATENT DOCUMENTS 6,260,045 B1 * 7/2001 Eidt ............................ 707/103
6,304,879 B1 * 10/2001 Sobeski et al. .............. 707/103
6,430,564 B1 * 8/2002 Judge et al. ................. 707/100
6,430,570 B1 * 8/2002 Judge et al. ................. 707/103

* cited by examiner

Primary Examiner—Glenn Gossage
(74) Attorney, Agent, or Firm—Stuart T. Langley; William J. Kubida; Hogan & Hartson LLP

(57) ABSTRACT

A caching pattern and associated method for caching in a programming environment are disclosed. The caching pattern includes an extensible cache entry component that includes methods for retrieving, updating, and setting expiration parameters for a cache entry. A cache store component includes methods for reading and writing objects to cache entries. A cache manager component includes methods implementing a first interface to the cache store component to cause the cache store component to read and write objects to the data store and includes methods implementing a second interface to the cache entry component for adding, removing, getting and committing data to the cache entry. The cache store component may also include instantiating a virtual machine and the caching pattern may be used, in one embodiment, in a JAVA programming environment.

4 Claims, 3 Drawing Sheets

CACHING PATTERN AND METHOD FOR CACHING IN AN OBJECT-ORIENTED PROGRAMMING ENVIRONMENT

BACKGROUND OF THE INVENTION

1. Field of the Invention

The present invention relates, in general, to data caching and, more particularly, to a data caching pattern enabling caching in a distributed JAVA programming environment.

2. Relevant Background

The JAVA™ programming environment is a popular environment for implementing software systems. JAVA is a trademark of Sun Microsystems, Inc. in the United States and other countries. Because the JAVA programming environment is largely platform independent, programs are readily ported to a number of hardware and software platforms. This portability is particularly useful in distributed computing environments comprising a heterogeneous collection of clients, servers, and interconnection devices. For example, software applications based on world wide web infrastructure, also called "web-based applications" often rely on code, applets, servelets, beans, and the like to provide cross-platform functionality.

Computer software systems typically comprise a hierarchy of mechanisms with the user-level programs operating at or near the top of the hierarchy. In object oriented software environments a program is designed as a collection of interacting structures called "objects." Objects are characterized by the methods and attributes contained by the object and the interface used to access the object's methods and attributes. The attributes may be primitives such as an integer or string value, or may be a reference to another object. Objects having similar characteristics and common behaviors are grouped together into a "class".

Design patterns are one of the most effective and efficient techniques of object oriented design. A "pattern" can be defined as an abstraction from a concrete form which keeps recurring in specific non-arbitrary contexts. In other words, a software pattern is a structure or mechanism that embodies the essential features of a solution to a recurring problem. Hence, the pattern can be used to generate specific solutions to specific problems once the context of the specific problem is known. In this manner, a pattern provides a highly reuseable structure and makes efficient use of the software developer's efforts.

One recurring problem in web-based environments is speed performance. To implement web-based applications, data and objects are exchanged over a network connection. This exchange involves multiple types of data including calendar data, mail, messages, graphics, applets, and the like. The latency associated with this exchange is both large and variable. Caching is a widely used technique to improve data processing performance where access latency is a performance limiting factor. Caching technology is applied to almost every level of a computer implemented system including hardware and software managed caches.

Web-based applications typically benefit from object caches that store software objects referenced by the application in a local storage device such as memory or magnetic or optical disks. An initial reference to an object causes the object to be returned over the network from its source (e.g., a database, web server, or other resource). The returned object is then stored in a cache having a lower latency than the network. Subsequent references to the object can be obtained from the cache thereby avoiding the latency associated with the network connection.

One difficulty in implementing object caches for web-based applications is the great variety of object types that must be cached. An object holding a simple text record or hash table has quite different properties from another record holding a complex animated graphic. Moreover, the ever expanding use of web-based applications means that new object types, with corresponding new cache demands, are continually arising.

Until now, the some programming environments, such as the JAVA programming environment, have lacked a caching pattern for readily implementing caches for these heterogeneous objects. As a result, many application developers have chosen to not implement object caches. Where a n object cache was required, the application developer would create a unique caching solution to meet the needs of a specific application. Because these solutions were application-specific, they tend to not be reusable o r extensible t o new applications. What is needed is a reusable, flexible caching solution for web-based applications. More specifically, a need exits for a caching pattern for the JAVA programming environment.

A feature of some programming environments, including the JAVA programming environment, is that objects are passed by reference and not by value. In a cache solution this means that a cached object is not actually returned to the application when it is reused. Instead, only a reference to t he cached object is returned. Any changes made to the cached object by the calling are mad e on the cached object itself. This creates a coherency problem in that other processes that reference the cached object will see the changed object, no t the original. Hence, a need exists for a caching method and system that enables multiple processes to use cached objects coherently.

SUMMARY OF THE INVENTION

Briefly stated, the present invention provides a caching pattern including an extensible cache entry component that includes methods for retrieving, updating, and setting expiration parameters for a cache entry. A cache store component includes methods for reading and writing objects to cache entries. A cache manager component includes methods implementing a first interface to the cache store component to cause the cache store component to read and write objects to the data store and includes methods implementing a second interface to the cache entry component for adding, removing, getting and committing data to the cache entry.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application.

Accordingly, unless specified to the contrary the present invention is applicable to significantly larger, more complex network environments as well as small network environments such as conventional LAN systems. Also, the present invention is illustrated with examples using a JAVA programming environment. However, the present invention is readily applied to other object-oriented programming environments in which a caching pattern is useful.

Figure 1:
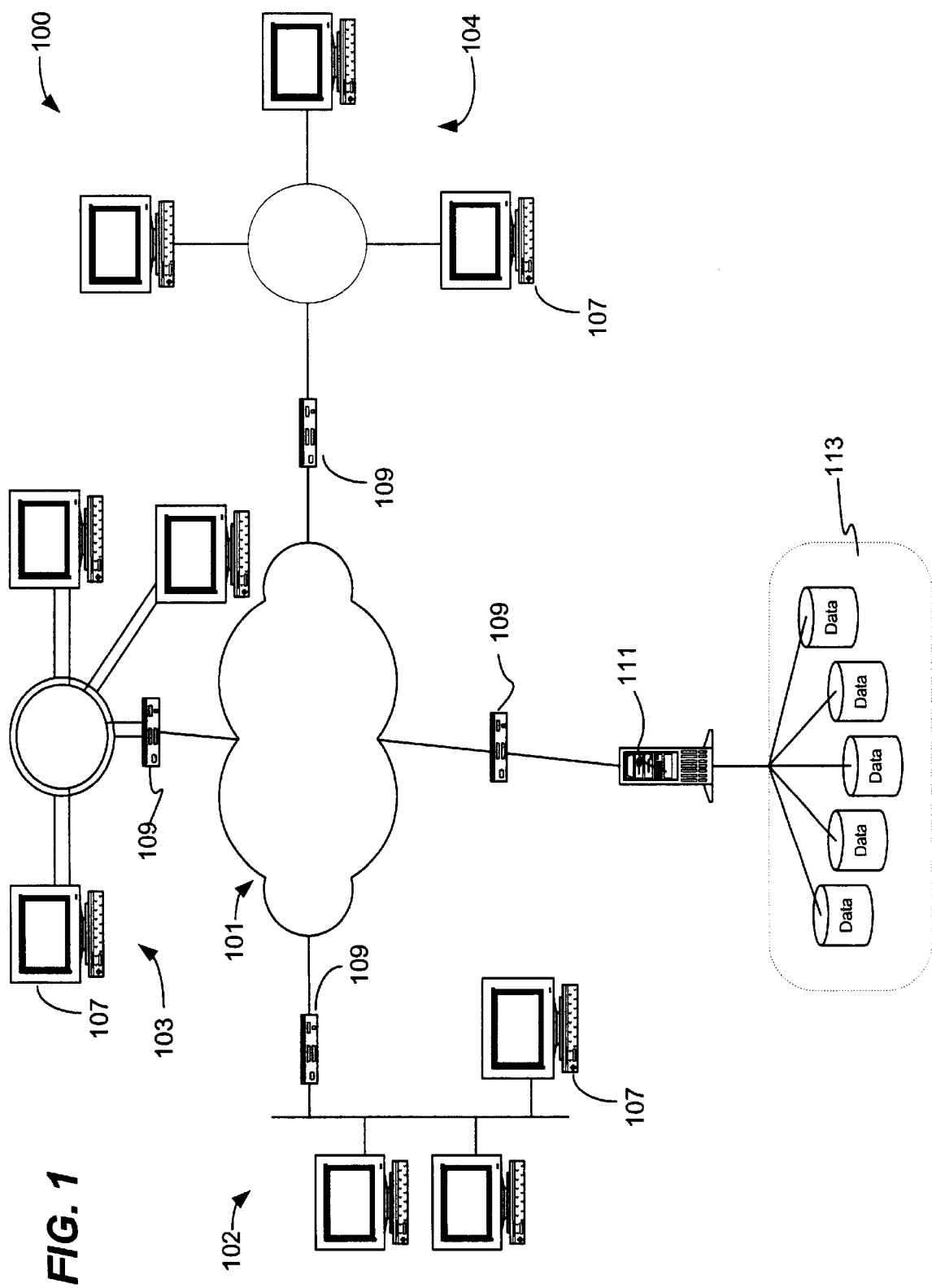
FIG. 1 shows a networked computer environment in which the present invention is implemented.

FIG. 1 shows an exemplary computing environment 100 in which the present invention may be implemented. Environment 100 includes a plurality of local networks such as Ethernet network 102, Fiber Distributed Data Interface (FDDI) network 103 and Token ring network 104. Essentially, a number of computing devices and groups of devices are interconnected through a network 101. For example, local networks 102, 103 and 104 are each coupled to network 101 through routers 109. Local area networks (LANs) 102, 103 and 104 may be implemented using any available topology and may implement one or more server technologies including, for example the UNIX™ operating environment, Novell, or Windows NT, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional wide area network (WAN) technologies.

Local networks 102, 103 and 104 include one or more workstations such as computers 107. One or more computers 107 may be configured as an application and/or file server. Each local network 102, 103 and 104 may include a number of shared devices (not shown) such as printers, file servers, mass storage and the like. Similarly, devices may be shared through network 101 to provide application and file services, directory services, printing, storage, and the like. Routers 109 provide a physical connection between the various devices through network 101. Routers 109 may implement desired access and security protocols to manage access through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1.

In addition to local memory and storage associated with each device, it is often desirable to provide one or more locations of storage such as virtual database 113 that provides mass storage capacity beyond what an individual device can efficiently use and manage. Selected components of the present invention may be stored in or implemented in mass storage. Virtual database 113 comprises a plurality of databases accessible directly by a server 111 or through a network connection. The number, kind, and location of databases within virtual database 113 may be static or dynamically selected. Connections between server 111 and virtual database 113 may be constant or set up on an as-needed basis. Each of the data stores that make up virtual database 113 may have its own unique data base management system (DBMS) including structured query language (SQL), object oriented data base (OODB), lightweight directory protocol (LDAP), and the like. It is contemplated that one or more of the data stores within virtual database 113 may actually comprise other data server programs that themselves access a plurality of external databases. In the example of FIG. 1, server 111 acts as a network accessible gateway to implement the specific access protocols required by a particular data store or database management system.

Figure 2:
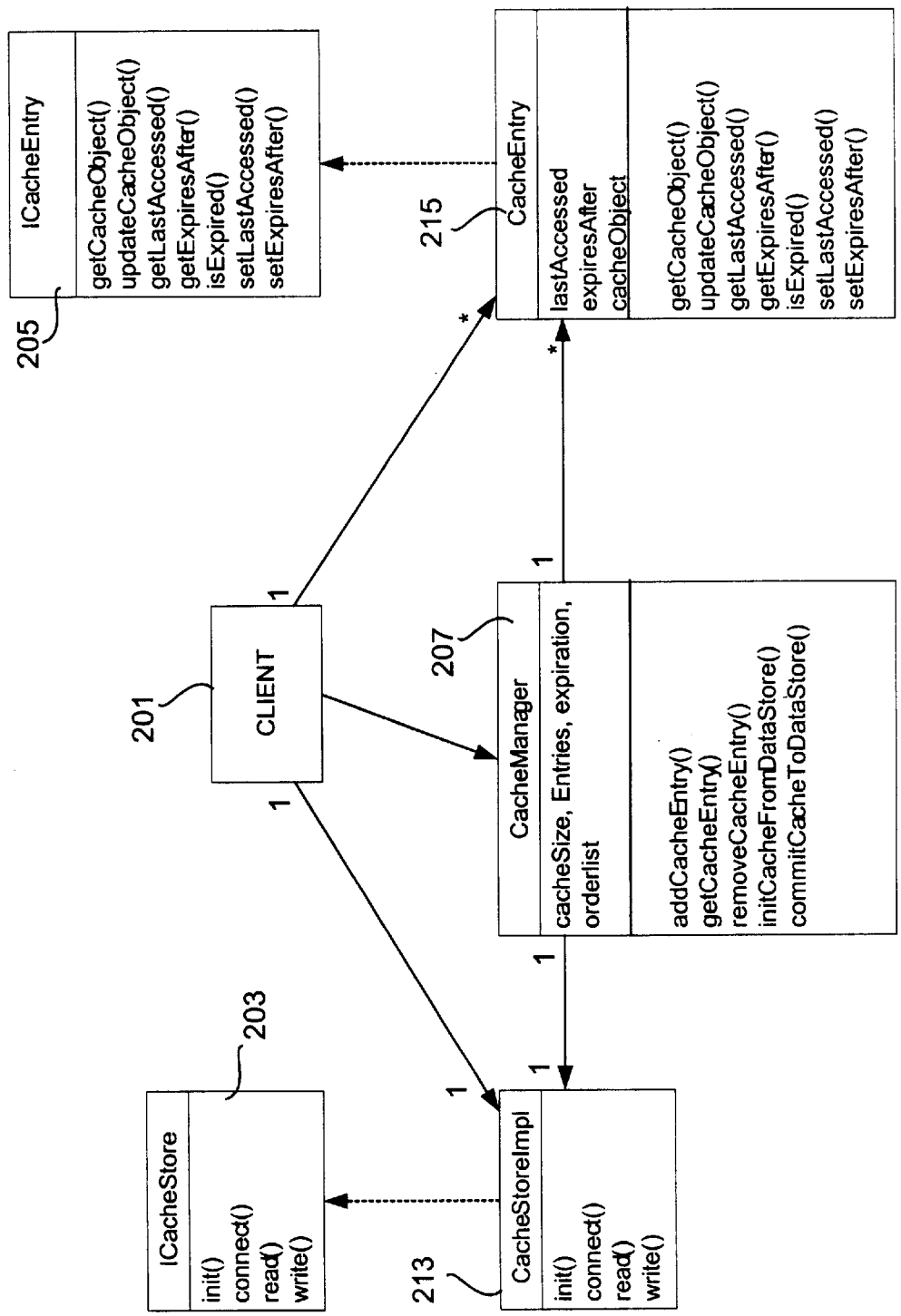
FIG. 2 shows significant components of a caching pattern in accordance with the present invention.

FIG. 2 illustrates a diagram of principle components of a caching pattern in accordance with the present invention. Client 201 comprises a program running on any one of the machines 107, 109, or 111 shown in FIG. 1. It is important to understand that the designation "client" in the discussion of FIG. 2 simply means that the program is a client of some other service. A particular computer may implement both client and server programs. For example, server 111 may implement a web server application, but also implements client applications with respect to the virtual database 113. In a particular example, client 201 is implemented in a machine such as server 111 shown in FIG. 1. Server 111 serves data requests received through network 101 from various clients 107. Hence, the cache implemented in accordance with the present invention is caching data received from virtual database 113 so that web server 111 can respond more quickly to access requests. Alternatively or in addition, some or all of clients 107 may implement a cache in accordance with the present invention to avoid latency associated with contacting server 111. Similarly, routers 109, or other network components within network 101 may implement a cache in accordance with the present invention to provide lower latency access to network elements that they serve. These and other embodiments are within the scope of t he present invention.

The present invention is particularly useful in the JAVA programming environment which lacks a native cache pattern useful for creating generic cache structures. The present invention is equally useful in any programming environment that similarly lacks a native cache pattern or includes a native cache pattern that is for some reason undesirable to use in a particular application. The pattern shown in FIG. 2 includes pattern elements 203 and 205 that serve as patterns for specific cache implementations. In a specific application, an application developer creates one or more instances of the ICacheStore pattern element 203 where the instances are labeled CacheStoreImpl 213 in FIG. 2. Similarly, for each type of data, a CacheEntry instance 215 of the ICacheEntry element 205 is created. Also, a CacheManager instance 207 is created from a CacheManager class (not shown). In each case, the instances 213 and 215 are customized to meet the needs of the application. In the case of CacheStoreImpl instances it is contemplated that the instance will not be extended (i.e., require additional specifications), but some methods specified in the ICacheStore pattern element 203 may not be included in a specific implementation.

CacheManager instance 207 includes data structures indicating the cache size (e.g., cacheSize), the number of cache entries (e.g., Entries), the expiration parameters indicating when entries will be forced to be considered invalid, and "orderlist". CacheManager instance 207 includes methods implementing a first interface to the CacheStoreImpl instance 213 that initialize a cache from a data store device in which the cache is stored (e.g., initCacheFromDataStore( )) and commit the cache to persistent storage in its assigned data store (e.g., commitCacheToDataStore( )). CacheManager instance 207 also includes methods implementing a second interface to the CacheEntry component for initializing a cache entry from a data store (i.e., initCacheFromDataStore( )) as well as primitive cache functions for adding, getting, removing, and committing a cache entry to the data store. It is contemplated that the CacheManager instance 207 will not require extension from its patterned class.

ICacheStore pattern element 203 comprises a class definition that defines methods for creating a cache within a data store. ICacheStore pattern element 203 includes methods for initializing the cache within the data store and connecting to the data store. In a particular example where the data store in which the cache resides is an LDAP-managed directory, the init( ) method initializes the data store and the connect( ) method establishes a directory context. ICacheStore pattern 203 also includes methods for reading and writing to the data store. In the LDAP example, the read( ) method must appropriately read from the directory context and construct a hash table of appropriate CacheEntry objects and the write( ) method must dissect the CacheEntry objects into directories and its entries and write them to the LDAP store. It is contemplated that the CacheStoreImpl instance 213 will not require extension from its patterned class ICacheStore 203.

The CacheEntry instance 215 is the only component that will require extension from its parent class ICacheEntry pattern element 205 to build a cache. CacheEntry instance 215 functions to declare and maintain the cached object. A CacheEntry object instance exists for each cached object. Any number of CacheEntry instances may be created up to the Entry limit specified in the CacheManager object or instance. Although each CacheEntry instance 215 may contain a wide variety of object types, the interface to each is substantially similar with respect to CacheManager instance 207 and Client 201. Hence, CacheManager instance 207 need not be aware of any specifics of the contents of a specific CacheEntry instance 215—all are managed in the same manner. This feature is an important advantage in that the CacheManager instance 207, cacheStoreImpl component 213, and client 201 need no special coding, data structures, or methods to cache any type of object.

In operation, client 201 constructs and loads CacheEntry objects or instances 215. Client 201 subsequently uses the methods in the CacheManager to add, get, and retrieve CacheEntry instances 215. Client 201 can also store and retrieve cached objects using the methods provided in the CacheManager instance 207.

For example, in a typical web application a web site that is being implemented may have a number of graphic components in one or more graphics formats such as bitmaps, GIF, and/or JPEG. A multimedia component may be included as an MPEG file, along with some text components. Often times a web site provides dynamically selected data as well. The different components are identified in the web site's source as references to data storage devices where the content is physically stored.

To implement a cache, the caching pattern in accordance with the present invention is included in the program code implementing the web server. A web site developer defines a CacheEntry instance 215 for each type of data that is to be cached. For example, a JPEG object will have a first defined CacheEntry instance 215 while a text object will have a second defined CacheEntry instance 215 and a multimedia component will have a third defined CacheEntry instance 215. Dynamic data such as search results or directory-based information such as form data or user profile data may be returned as raw data and converted by client 201 into a hash table (i.e., a set of key:value pairs) or a vector of hash tables. A CacheEntry instance 215 is then defined to contain the hash table or vector of hash tables rather than the raw data elements. This flexibility in the definition of CacheEntry instances 215 based upon the cache pattern in accordance with the present invention allows complex objects to be cached with little design effort on the part of the application developer.

Basic functionality of the ICacheEntry class 215 includes defined methods for getting and updating a cache object 215 from the cache using a cache object identifier (getCacheObject( ) and updateCacheObject( ) in FIG. 2). Cache objects 215 can also be retrieved without their object identifier using the getLastAccessedo( ) method. Cache entry maintenance methods for obtaining and managing expiration of cache entries are also defined (i.e., getExpiresAfter( ), isExpired( ), setExpiresAfter( ) in FIG. 2).

The CacheEntry instance 215 includes data structures holding a timestamp or other time indicator of the last access time, a value indicating when the cache entry expires, and the cached object itself (cacheObject in FIG. 2). Some or all of the methods of the ICacheEntry class 205 are included in the CacheEntry instance 215. For some types of cached objects, such as read only objects, it is not necessary to include methods for updating the cached object, for example. It is contemplated that CacheEntry instance 215 may be extended from the class ICacheEntry 205 by omitting these unnecessary method(s).

Additional methods may be added to the CacheEntry instance 215 to handle instance-specific features. One feature of some programming environments, such as the JAVA programming environment, is that objects are returned by reference rather than by value. This means that when cache manager instance 207 "returns" a cached object, the native performance of the programming environment is to return only a value indicating where the cached object is stored. However, this native performance is not ideal for a cache situation since any operations performed by the process within client 201 that is calling the cached object will change the cached object itself rather than a copy of the cached object. In such a case all other processes that refer to the object stored in cache will be affected by the changes made by the first process.

To ensure coherency and prevent changes to the cached object, the getCacheObject( ) method defined by the ICacheEntry class 205 should perform cloning if the process retrieving the cached object is allowed to change the cached object (i.e., the cache object allows write permissions). In the JAVA programming environment not all objects are cloneable. To be cloneable the object must implement the "cloneable" interface. However, the caching pattern in accordance with the present invention is preferably designed to handle both cloneable and noncloneable objects.

Accordingly, the getCachedObject( ) method tests the object to determine if it is cloneable. For cloneable objects cloning is readily achieved using the native clone( ) method of the JAVA programming environment. This creates an object of the same type as the cached object and initializes the new object's member variables to have the same values as the original object's corresponding member variables. For objects that do not implement the cloneable inteface, the clone( ) method causes an exception to be thrown. GetCachedObject( ) preferably includes exception handling logic for creating a new object of the same type as the cached object and copying each member variable of the cached object to the new object. In essence these steps make every object cloneable for purposes of the cache in accordance with the present invention even when the object does not implement the cloneable interface. Significantly, the getCachedObject( ) method returns the actual cached object value, not just a reference to the cached object.

In this manner the present invention provides a JAVA caching pattern that enables a client 201 to connect to a persistent data store using the CacheStoreImpl object, manipulate and manage cache entries using the CacheManager class in a manner that does not require detailed knowledge of the characteristics of the object that is being cached. Each cache entry is contained within a CacheEntry object 215 that presents a generic interface to the cache manager instance 207 and client 201. The invention permits persistent or temporary storage of cached objects that can be useful not only to improve speed performance, but to make remote objects available in case of emergency failures of the primary data store. The invention can be implemented in any device in a distributed network including user machines, web browsers, web servers, database servers, as well as routing and switching components.

Figure 3:
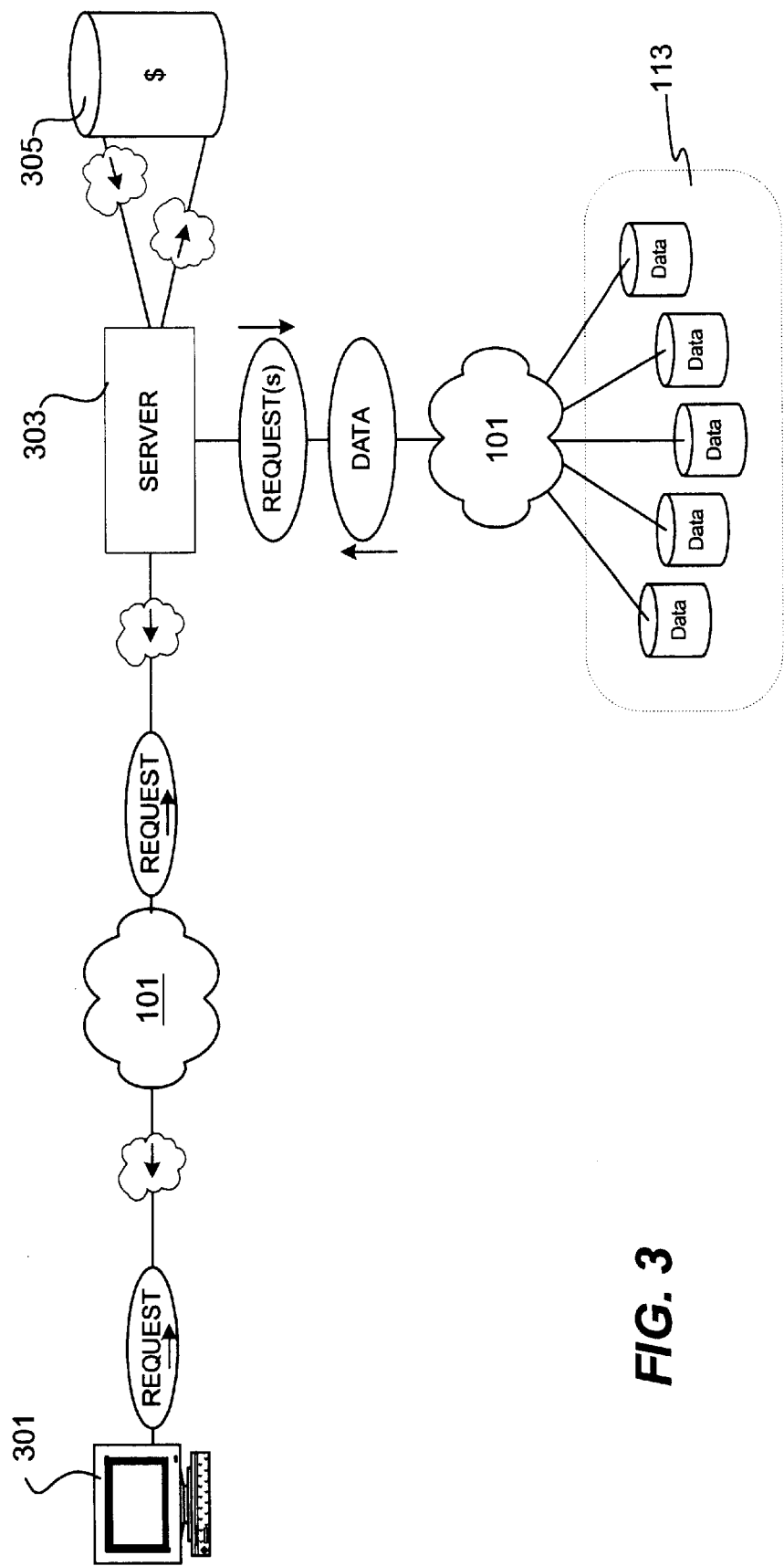
FIG. 3 illustrates a data flow diagram of typical cache operation in accordance with the present invention.

FIG. 3 illustrates data flow of caching operations in accordance with the present invention. In the example of FIG. 3 client 301 represents a user machine such as a personal computer, workstation, web appliance, or the like implementing a web-based application. Client 301 communicates with a web server 303 through a network component 101. Communication with web server 303 can be readily implemented in an Internet environment using standardized TCP/IP protocols and hypertext transfer protocol (HTTP) and hypertext markup language (HTML) formatting. Many equivalent protocols and document formats are available, but these specific examples illustrate typical web-based application techniques.

Web server 303 essentially operates as a front-end for providing data objects to client 301. In a database environment the data objects may comprise information from various web-based and non-web-based data sources. In an electronic commerce environment the data objects may comprise a mix of catalog information, graphic information, and transaction-specific information such as credit card numbers, delivery addresses and the like. Some of the data objects may be stored in devices local to server 303 while others are obtained from external data sources such as virtual database 113.

In response to a received request, server 303 generates one or more requests to the individual data store devices that make up virtual data store 113. As shown in FIG. 3 server 303 communicates with virtual database 113 through the network 101, although it is contemplated that a network independent from network 101, such as a LAN or wide area network (WAN), would be an equivalent substitute. In response to the requests virtual database 113 returns raw data and/or data objects to server 303. Some of the returned data may actually be brought data returned from non-object-oriented databases, legacy systems, and the like. Server 303 packages the brought data and returned data objects into a format requested by client 301.

In accordance with the present invention server 303 checks to determine if the returned or generated data object is cacheable. In the case of cacheable objects the object is stored to cache 305. To accomplish this, methods within the CacheStoreImpl object 213 are employed to connect to cache storage 305. Cache manager 207 is instantiated. For each object to the cached a cache entry 215 is instantiated. Once the data object is contained in a cache entry 215 cache manager 207 uses the getCacheEntry( ) method to access the cache entry object 215. In response, cache entry 215 clones the cached object and returns the value of the cloned object to server 303. In this example server 303 is actually in the role of client 201 shown in FIG. 2. Server 303 returns the clone data object through network 101 to the requesting client 301.

The cache in accordance with the present invention may be implemented in client 301 as well as within server 303. One advantage of the present invention is that because it operates at the user application level it can be implemented in almost any program application. The application can choose and manage which types of objects are to be cached. Because the cache entry implementation 215 overrides the cacheable interface option of JAVA objects, even in a non-cloneable objects can be cached.

Although the invention has been described and illustrated with a certain degree of particularity, it is understood that the present disclosure has been made only by way of example, and- that numerous changes in the combination and arrangement of parts can be resorted to by those skilled in the art without departing from the spirit and scope of the invention, as hereinafter claimed.

I claim:

1. A caching pattern comprising:

an extensible cache entry component including methods for retrieving, updating, and setting expiration parameters for a cache entry;

a cache store component including methods for reading and writing objects to cache entries;

a cache manager component including methods implementing a first interface to the cache store component to cause the cache store component to read and write objects to a data store and including methods implementing a second interface to the cache entry component for adding, removing, getting and committing data to a cache entry.

2. The caching pattern of claim 1 wherein the cache entry component, when instantiated, includes structures for containing a cached entry object, the cache entry object including methods implementing an interface to the cached object.

3. A method for caching in a programming environment comprising:

instantiating a virtual machine (VM) in a computer; and instantiating a cache entry for each item to be cached from a cache entry class, each cache entry including an interface for communicating with a cache manager;

instantiating the cache manager, the cache manager implementing methods to add, remove, get, and commit items to a cache entry; and instantiating a cache store component including methods for reading to and writing from the cache entry.

4. The method of claim 3 wherein the cache store component further comprises methods to initialize and connect to the cache entry.

* * * * *